United States Patent [19]

Melchior et al.

[11] Patent Number: 5,018,354

[45] Date of Patent: May 28, 1991

[54] AUXILIARY COMBUSTION CHAMBERS FOR SUPERCHARGED INTERNAL COMBUSTION ENGINES AND INTERNAL COMBUSTION ENGINES EQUIPPED WITH SUCH A CHAMBER

[75] Inventors: Jean Melchior; Thierry Andre, both of Paris, France

[73] Assignee: Etat Francais, Represente Par Le Delegue General Pour L'Armament, Paris Armees, France

[21] Appl. No.: 348,490

[22] PCT Filed: Jul. 25, 1988

[86] PCT No.: PCT/FR88/00385

§ 371 Date: Mar. 16, 1989

§ 102(e) Date: Mar. 16, 1989

[87] PCT Pub. No.: WO89/01090

PCT Pub. Date: Feb. 9, 1989

[30] Foreign Application Priority Data

Jul. 23, 1987 [FR] France .................... 87 10446

[51] Int. Cl.$^5$ .............................................. F02B 37/00
[52] U.S. Cl. ......................................... 60/606; 60/612
[58] Field of Search ......................... 60/605, 606, 612

[56] References Cited

U.S. PATENT DOCUMENTS

| | | | |
|---|---|---|---|
| 4,026,115 | 5/1977 | Melchior | 60/606 |
| 4,616,481 | 10/1986 | Melchior | 60/606 |
| 4,785,635 | 11/1988 | Melchior | 60/606 |

Primary Examiner—Douglas Hart
Attorney, Agent, or Firm—Larson & Taylor

[57] ABSTRACT

The primary zone (1) of the auxiliary combustion chamber has a shape of revolution about an axis (X—X) and is defined by a flame tube (2) which is of cylindrical and/or frustoconical shape, coaxial with said axis (X—X), smooth and devoid of air supply orifices of notable section, and by the chamber inner end (3) which is movable in a direction parallel to said axis (X—X) and cooperates with a fixed seat (13) rigidly connected to the flame tube (2) and separating the primary zone (1) from a cavity (4) so as to constitute, with the chamber inner end (3), throttling means (31) which have a variable passage section and are constituted by a sleeve (10) rigidly connected to a balancing piston (11), which sleeve and piston are coaxial with said axis (X—X), the balancing piston (11) being slidable in a cylindrical bearing surface (12) rigidly connected to the walls of the cavity (4). The inlet of the fuel under pressure is constituted by at least one nozzle (14) which is arranged in said sleeve (10) in such manner as to open out toward the primary combustion zone (1).

20 Claims, 8 Drawing Sheets

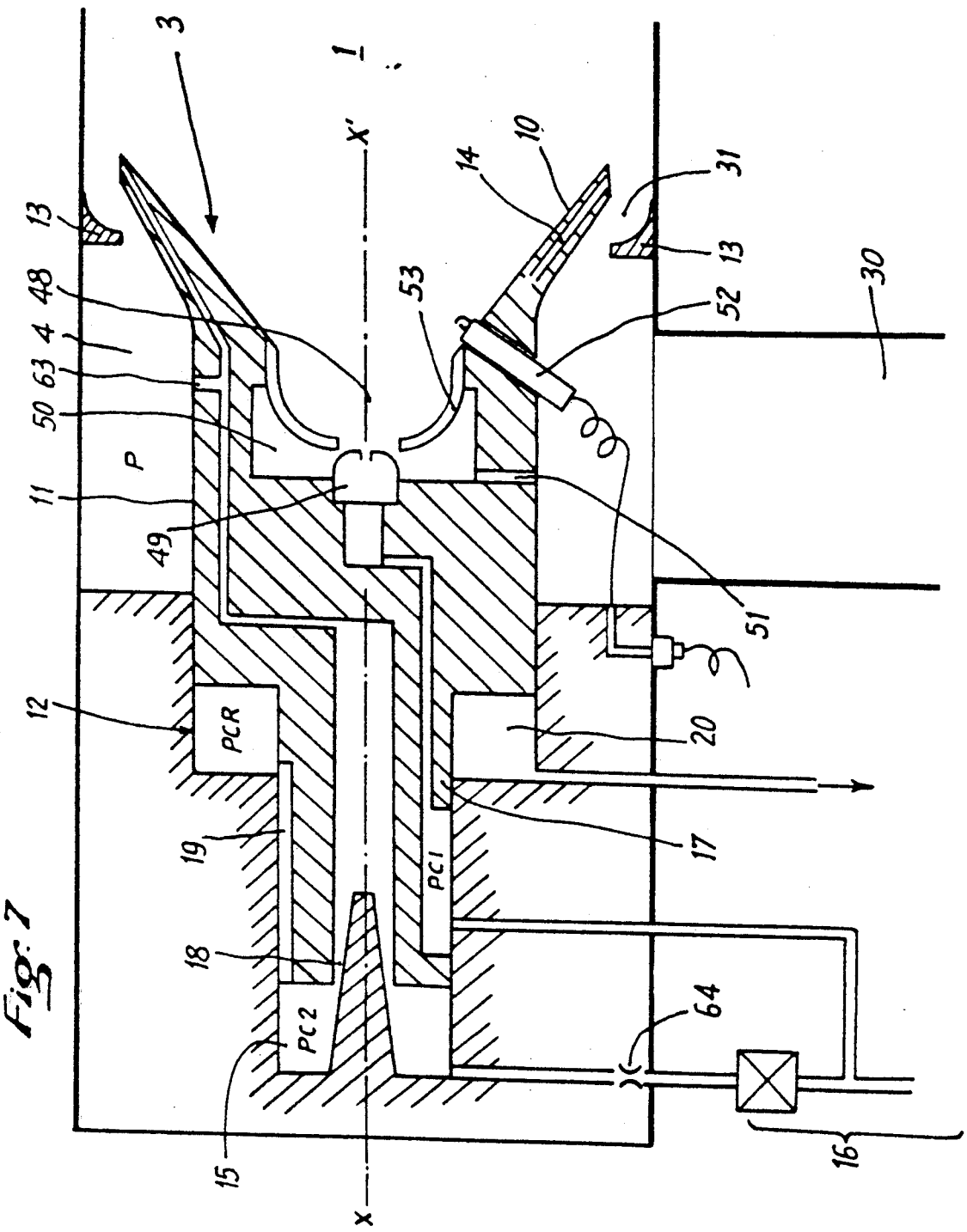

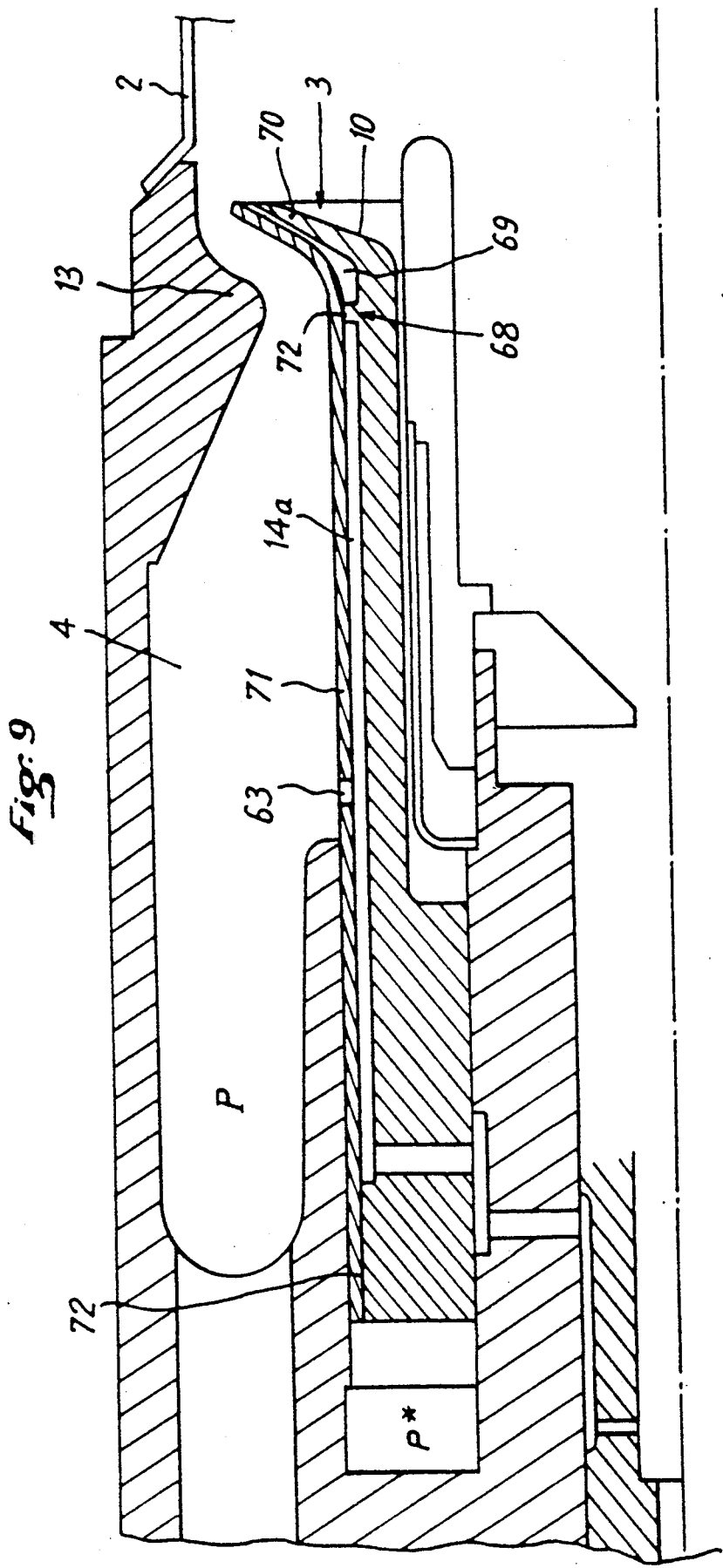
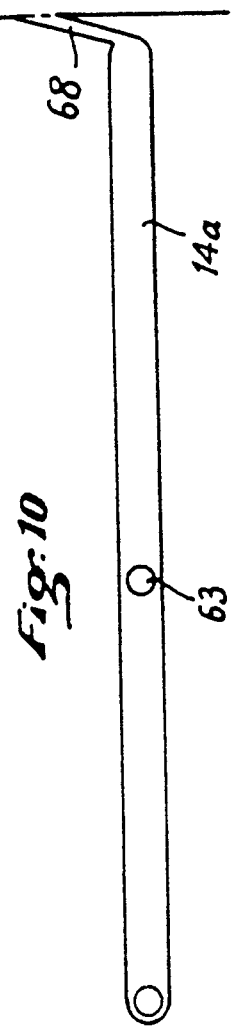
Fig. 9
Fig. 10

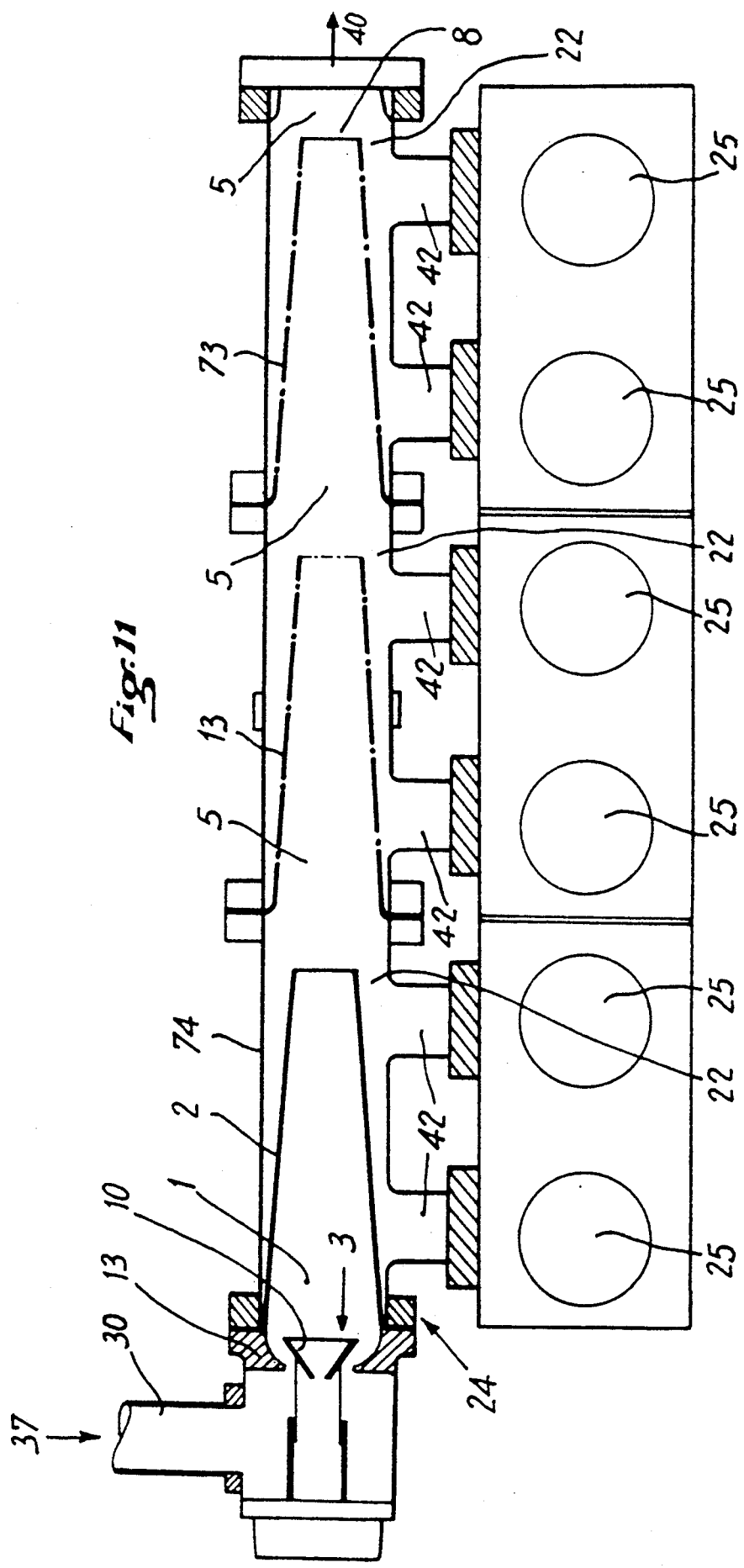

AUXILIARY COMBUSTION CHAMBERS FOR SUPERCHARGED INTERNAL COMBUSTION ENGINES AND INTERNAL COMBUSTION ENGINES EQUIPPED WITH SUCH A CHAMBER

According to one of its aspects, the invention relates to an auxiliary combustion chamber for an internal combustion engine supercharged by a turbocompressor whose compressor air outlet communicates with the air inlet of the working chambers of the engine and with a bypass pipe provided with throttling means having a variable passage section and whose turbine gas inlet communicates with the gas outlet of said working chambers and with the bypass pipe on the downstream side of said throttling means, which combustion chamber comprises:

a primary combustion zone which is defined by a flame tube and a chamber inner end and communicates with a first cavity connected to the bypass pipe, a secondary dilution zone located on the downstream side of said primary zone and communicating with a second cavity connected to the gas outlet of the working chambers and whose gas outlet communicates with the gas inlet of the turbine, an inlet for fuel under pressure which is provided in the chamber inner end and opens onto the primary combustion zone, and ignition means for the fuel coming from said fuel inlet.

Such an auxiliary combustion chamber is disclosed for instance in FR-A-2,265,979.

An object of the invention is in particular to facilitate the combustion of the fuel in said primary zone, irrespective of the conditions of operation of the auxiliary combustion chamber, to protect the elements of the latter, and in particular those which cooperate in the regulation of the flow of combustion air admitted into said combustion chamber, against an excessive rise in the temperature, and prevent deposits of soot or coke.

To achieve this, the auxiliary combustion chamber defined hereinbefore is substantially characterized in that:

the primary zone has a shape of revolution around an axis and is defined by the flame tube of cylindrical and/or frustoconical shape, coaxial with said axis, smooth and devoid of air inlet orifices of notable section which may put the primary zone in communication with said first cavity, the chamber inner end which is movable in a direction parallel to said axis and cooperates with a fixed seat rigid with the flame tube and separating the primary zone from the first cavity in such manner as to constitute with the chamber inner end the throttling means having a variable passage section, and which is constituted by a sleeve connected to a balancing piston, which sleeve and piston are coaxial with said axis, the balancing piston being slidable in a cylindrical bearing portion fixed with the walls of the first cavity, and the inlet of fuel under pressure is constituted by at least one nozzle which is provided in said sleeve in such manner as to open toward the primary combustion zone, either separately or through a common slot. In the case of a plurality of nozzles, the latter are evenly spaced apart in a plane perpendicular to said axis.

The combustion chamber in question results, as a first advantage, in an economy of air. Indeed, all the fresh combustion air is introduced through the inner end of this chamber. The fresh air ensures the cooling of the flame tube. Consequently, it is no longer indispensable to cool the flame tube by an extraneous air flow through small orifices (the "film cooling" or porous or microperforated wall technique) although the possibility of such orifices is not completly excluded.

A second advantage of the auxiliary combustion chamber according to the invention is the technological simplicity of the flame tube which is a simple smooth tube not provided with orifices for the combustion air or generally for the cooling air. This technological simplicity has a double aspect, that of the great simplicity of manufacture (reduced cost, possibility of constituting this tube by a simple cast part, a ceramic part, etc.) and that of the thermal homogeneity of the material (whereas, in a chamber of conventional type, the orifices result in concentrations of thermal stresses which result in risks of cracking and/or deformation).

A third advantage resides in the facility of the metering of the combustion air. As this air is introduced through the chamber inner end, i.e. through the cold part of the auxiliary combustion chamber, the mechanical metering of the air is facilitated.

A fourth advantage resides in the ventilation of the internal walls of the primary zone. Indeed, the chamber inner end, by construction, and the internal cylindrical of the flame tube wall/are perfectly ventilated owing to the fact that they are swept by the combustion air: the parts are well cooled and the deposits of soot or coke are avoided.

According to a first improvement of the invention, the auxiliary combustion chamber is arranged in such manner as to ensure that the air flow through said throttling means does not undergo any rotating motion around said axis, which is liable to project the fuel mixed with this air flow outwardly under the centrifugal effect.

In this way, the quasi-totality of the fuel is made to burn in the auxiliary combustion chamber, which results in economy of fuel and contributes to the cleanness of the exhaust gases.

According to an advantageous construction, the nozzles are arranged in an approximately radial manner in the sleeve so as to open out in the vicinity of the trailing edge of the sleeve and preferably open out on the upstream side of the bearing portion of the sleeve on the fixed seat. The advantage of this construction is to determine a homogeneous distribution of the fuel on the periphery of the sleeve so as to achieve a good mixture of the fuel with the air. The nozzles open on to the vicinity of the seat, and therefore at the place where the velocity of the combustion air is maximum, which improves the mixture. The opening out on the downstream side of the seat permits the automatic purge of the nozzles when the supply of fuel is interrupted, provided the orifices put the passageway conducting the fuel to the nozzles in communication with the first cavity. preferably Said balancing piston cooperates/with a hydraulic piston which is slidable in a fixed cylindrical cavity which communicates with variable fuel pressure generating means and with the nozzles through a variable jet formed by the cooperation of two elements, namely a needle and an orifice, one of which is connected to the hydraulic piston and the other to the fixed cylindrical cavity in such manner that the passage section of the variable jet varies in the same direction as the passage section of the throttling means having a variable passage section.

The construction just described has the following effects:

the regulation of the combustion air flow and that of the fuel flow are carried out simultaneously, i.e. without staggering which could be due to delays in regulation, which ensures at every moment a correct air/fuel ratio;

the fact of balancing the sleeve (subjected to the air pressure) with a hydraulic piston of smaller diameter permits the use of a fuel pressure (PC2) which is always higher than the air pressure (P); thus the injection of fuel is always possible owing to the pressure difference prevailing across the variable jet and the nozzles;

lastly, the hydraulic control enables the moving parts to be cooled and lubricated.

According to an improvement in the aforementioned construction having a hydraulic piston, the latter has at least one recess which puts the fixed cylindrical cavity at variable fuel pressure in communication with a discharge cavity maintained at a pressure lower than the minimum value of said variable fuel pressure, the communication between the fixed cylindrical cavity and the discharge cavity being established when the movable piston passes beyond a previously fixed position in the direction for obtaining the maximum opening of the variable jet.

The effect of the latter improvement, which is important, is to achieve in a simple manner a fluid abutment. Indeed, when the auxiliary combustion chamber is subjected to a sudden rise in the operational conditions, the pressure regulating device is biased in such manner as to render the variable fuel pressure (PC2) maximum. This has for effect to put the chamber in the maximum opening position owing to the action on the hydraulic piston. The flow of injected fuel becomes maximum owing to the fact of the maximum opening of the variable jet and of the maximum reached by the differential pressure exerted on the injected fuel. However, owing to the inertia of the turbocompressor, the air pressure (P) will be slow to establish itself at the correct value, which could result in an insufficient in air/fuel ratio and therefore/a momentary overheating of the auxiliary combustion chamber and the turbine. There could be a danger of at least a partial destruction of the turbine by the extension of the flame or there could be a danger of the latter extinguishing due to insufficient air. Said recess avoids or rather limits these undesirable phenomena, as will be explained in detail hereinafter.

According to a first solution, the balancing piston is rigidly connected to the hydraulic piston and the bypass pipe is divided into two branches. The first of these branches puts the air outlet of the compressor in communication with the first supply cavity of the primary zone of the combustion chamber. The second of these branches puts the outlet of the compressor in communication with the second supply cavity of the secondary dilution zone of the auxiliary combustion chamber and it is provided with a second throttling means having a variable passage section located on the upstream side of the communication with the second cavity, and on the upstream side of the communication with the gas outlet of the working chambers of the engine. These second throttling means are preferably so arranged that the pressure difference $\Delta P$ produced thereby varies in the same direction as the air pressure P and more precisely, as disclosed in FR-A-2,179,310, 2,222,537 and 2,308,792, in proportion to the difference between the pressure P and a reference pressure P*.

The effect of this first solution is to regulate the pressure difference $\Delta P$ independently of the speed of rotation of the engine and therefore of the air flow flowing in the bypass pipe, irrespective of the state of the auxiliary combustion chamber.

According to a second solution, the balancing piston is disconnected from the hydraulic piston and freely slides in the fixed cylindrical bearing surface in the direction for opening the throttling means and cooperates, by bearing against an abutment connected to the hydraulic piston, with this hydraulic piston when the throttling means are moved in the closing direction. Furthermore, the side of the balancing piston remote from the sleeve defines, with the fixed cylindrical bearing surface, a cavity in which a reference pressure prevails and which is separated from the first cavity in which the air pressure prevails, so that the pressure difference $\Delta P$ produced by the throttling means having a variable passage section is proportional to the difference between said air pressure and the reference pressure when the balancing piston does not bear against the abutment connected to the hydraulic piston.

The effect of this second solution is to combine into a single unit the first and second throttling means and to conjugate the functions thereof. A simpler and cheaper assembly is in this way obtained.

According to another of its aspects, the invention relates to internal combustion engines provided with auxiliary combustion chambers whose essential characteristics have been defined hereinbefore.

Further features and advantages of the invention will be apparent from the following supplementary description which refers to the accompanying drawings, in which:

FIG. 7 is a view of an auxiliary combustion chamber according to the invention including complementary improvements.

FIG. 9 is an axial sectional view to an enlarged scale of a variant of the outlets of the fuel supply orifices of the auxiliary combustion chamber.

FIG. 10 is a view of a detail of FIG. 9 in a plane perpendicular to that of the last-mentioned Figure.

FIG. 11 is a view of another variant.

Figure 1:
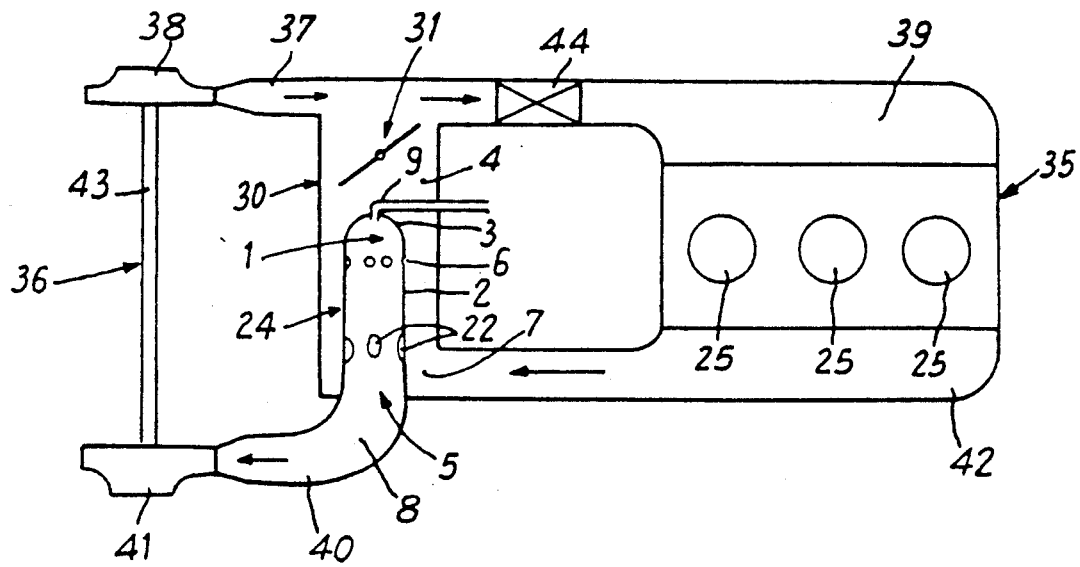
FIG. 1 is a diagrammatic view of a supercharged internal combustion engine provided with an auxiliary combustion chamber which may be established in accordance with the invention.

The invention relates to an auxiliary combustion chamber 24 for an internal combustion engine 35 supercharged by a turbocompressor 36 of the general type shown in FIG. 1. The engine 35 may be in particular an engine whose ignition is operated by compression or controlled by sparks. As shown in this FIG. 1, the air outlet 37 of a compressor 38 communicates with the air inlet 39 of the working chambers 25 of the engine 35 and with a bypass pipe 30. Generally, each working chamber 25 is defined by a piston inside a cylinder. The gas inlet 40 of a turbine 41 communicates with the gas outlet 42 of the working chamber 25 and with the bypass pipe 30. With the compressor 38 which it drives mechanically, generally through a shaft 43, the turbine 41 constitutes the turbocompressor 36, which may have a single stage (as shown diagrammatically) or at least two stages. An inlet air cooler 44 is generally placed on the upstream side of the air inlet 39 of the working chambers 25. The bypass pipe 30 is provided with throttling means 31 having a variable passage section.

The auxiliary combustion chamber 24 comprises, in the following order in the downstream direction, a primary combustion zone 1 and a secondary dilution zone 5. The primary zone 1 which is defined by a flame tube 2 and by a chamber inner end 3, communicates through at least one passage 6 with a first cavity 4 which is connected to the bypass pipe 30. The secondary dilution zone 5, located on the downstream side of the primary zone 1, communicates with a second cavity 7 connected to the gas outlet 42 of the working chambers 25 and through ports 22, according to the embodiments of FIGS. 1 and 4, with the bypass pipe 30. The ports 22 are provided in a dilution tube 65 which follows on the flame tube 2. The gas outlet 8 of the secondary zone 5 communicates with the gas inlet 40 of the turbine 41.

According to the variant shown in FIG. 11, the dilution zone is constituted by the exhaust manifold 74 of the engine 35. The dilution tube 65 may be replaced by a plurality of cones 73. The ports 22 are in this case concentric passageways. Although perhaps less preferable, the cones 73 are not indispensable and this is why they have been shown in dot-dash lines.

An inlet 9 of fuel under pressure provided in the chamber inner end 3 opens onto the primary zone 1. Lastly, the auxiliary combustion chamber 24 comprises ignition means for the fuel from the inlet 9. These means are not shown in FIG. 1 but in FIG. 7 where they are designated by the reference numeral 52.

Figure 2:
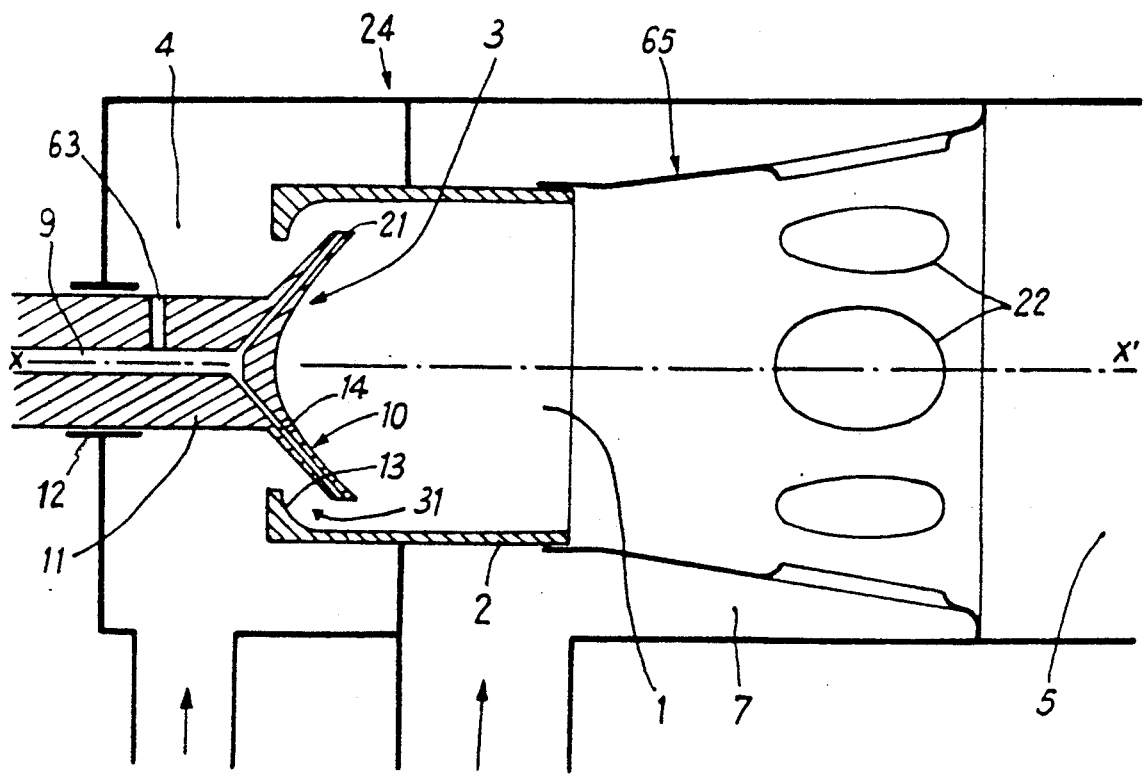
FIG. 2 is a partial diagrammatic axial sectional view to an enlarged scale of an auxiliary combustion chamber according to the invention.

According to the invention and as diagrammatically illustrated in FIG. 2, the primary zone 1 has a shape of revolution about an axis X—X' and is defined by the flame tube 2 and the chamber inner end 3.

The flame tube 2 has a cylindrical and/or frustoconical shape, is coaxial with the axis X—X', smooth and devoid of air supply orifices of notable section which may put the primary zone 1 in communication with the first cavity 4. The expression "devoid of air supply orifices of notable section" does not exclude the presence of orifices or passageways of small section which may ensure a supplementary cooling of the flame tube 2.

The chamber inner end 3 which is movable in a direction parallel to the axis X—X' cooperates with a fixed seat 13 rigidly connected to the flame tube 2 and separating the primary zone 1 from the first cavity 4 so as to constitute, with the movable inner end 3, the throttling means 31 having a variable passage section. Arranged in this way, the passageways 6 putting the first cavity 4 in communication with the primary combustion zone 1 coincide with the throttling means 31 having a variable passage section as described in FR-A-2,265,979. The chamber inner end 3 is constituted by a sleeve 10 rigidly connected to a balancing piston 11, the sleeve 10 and the piston 11 being coaxial with the axis X—X'. The balancing piston 11 slides in a cylindrical bearing surface 12 rigidly connected to the walls of the first cavity 4. The inlet 9 of fuel under pressure is formed by a plurality of nozzles 14 which are evenly spaced apart in a plane perpendicular to the axis X—X' and are provided in the sleeve 10 in such manner as to open separately onto the chamber inner end 3 toward the primary combustion zone 1.

In the variant illustrated in FIGS. 9 and 10, the fuel is introduced into the chamber through a plurality of grooves 14a which are similar to the nozzles 14 but open onto an annular cavity 69 through preferably tangential slots 68. The grooves 14a communicate with the first cavity 4 through purge orifices 63. The annular cavity 69 opens on the downstream side of the seat 13 onto the periphery of the sleeve 10 owing to a continuous slot 70. The slot 70, the cavity 69 and the grooves 14 are enclosed by a liner 71 which is a force fit on bearing surfaces 72. Thus, the fuel which is metered by the jet 18 and is previously mixed with air introduced through the orifices 63, forms a homogeneous and continuous film in the cavity 69, escapes through the continuous slot 70 and burns in the slip-stream created by the sharp edge of the sleeve 10.

The auxiliary combustion chamber 24 is preferably arranged in such manner as to ensure that the mixture of air which penetrates between the periphery of the sleeve 10 and the seat 13 and fuel which issues from the nozzles 14 does not turn round the axis X—X' within the flame tube 2, which thus prevents the fuel of this mixture from being thrown outwardly by the centrifugal effect.

According to a preferred construction, the nozzles 14 are arranged in an approximately radial manner in the sleeve 10 so as to open onto the vicinity of the trailing edge 21 of the sleeve 10. As shown in FIG. 2, the nozzles 14 preferably open out on the downstream side of the bearing surface of the sleeve 10 under the fixed seat 13.

Figure 8:
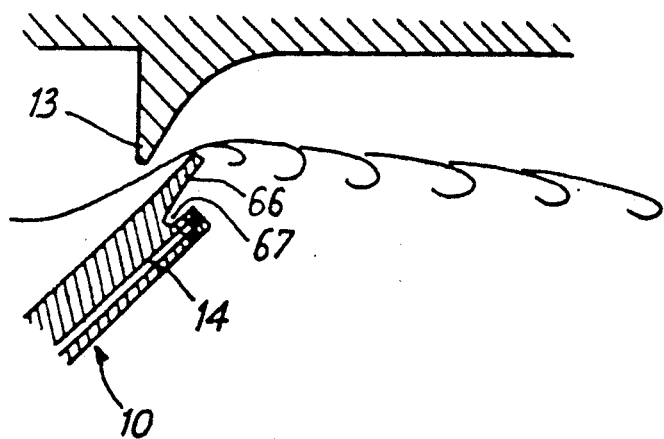
FIG. 8 is a diagrammatic axial semi-sectional view of a variant of the sleeve constituting the inner end of the auxiliary combustion chamber.

The improvement diagrammatically shown in FIG. 8 has for purpose to improve the mixture of air and fuel introduced into the primary zone 1 by avoiding defects of homogeneity in the distribution of the fuel on the periphery of the sleeve 10 and to ensure that the droplets of fuel are not subjected to any centrifugal velocity component, i.e. a component oriented toward the inner wall of the flame tube 2, since the combustion would be incomplete if the fuel reached this wall.

For this purpose, the nozzles 14 are oriented in accordance with an arrangement which is as even as possible, toward the inner wall of a groove 67 provided on the outer edge of the sleeve 10, which effectively ensures that the droplets issuing from the nozzles 14 are not subjected to any centrifugal velocity component. The homogeneity of the air/fuel mixture is still further improved by arranging that the outlet of the nozzles 14 is arranged in a tangential direction relative to the periphery of the sleeve 10. By extending the groove 67 by an annular nose portion 66, on the upstream side of the outlets of the nozzles 14, the formation of a fuel film is facilitated which will be aspirated and atomized by the flow of the air of combustion. The trailing edge of the nose portion 66 is preferably a sharp edge so as to favour the formation of turbulent vortices.

Figure 3:
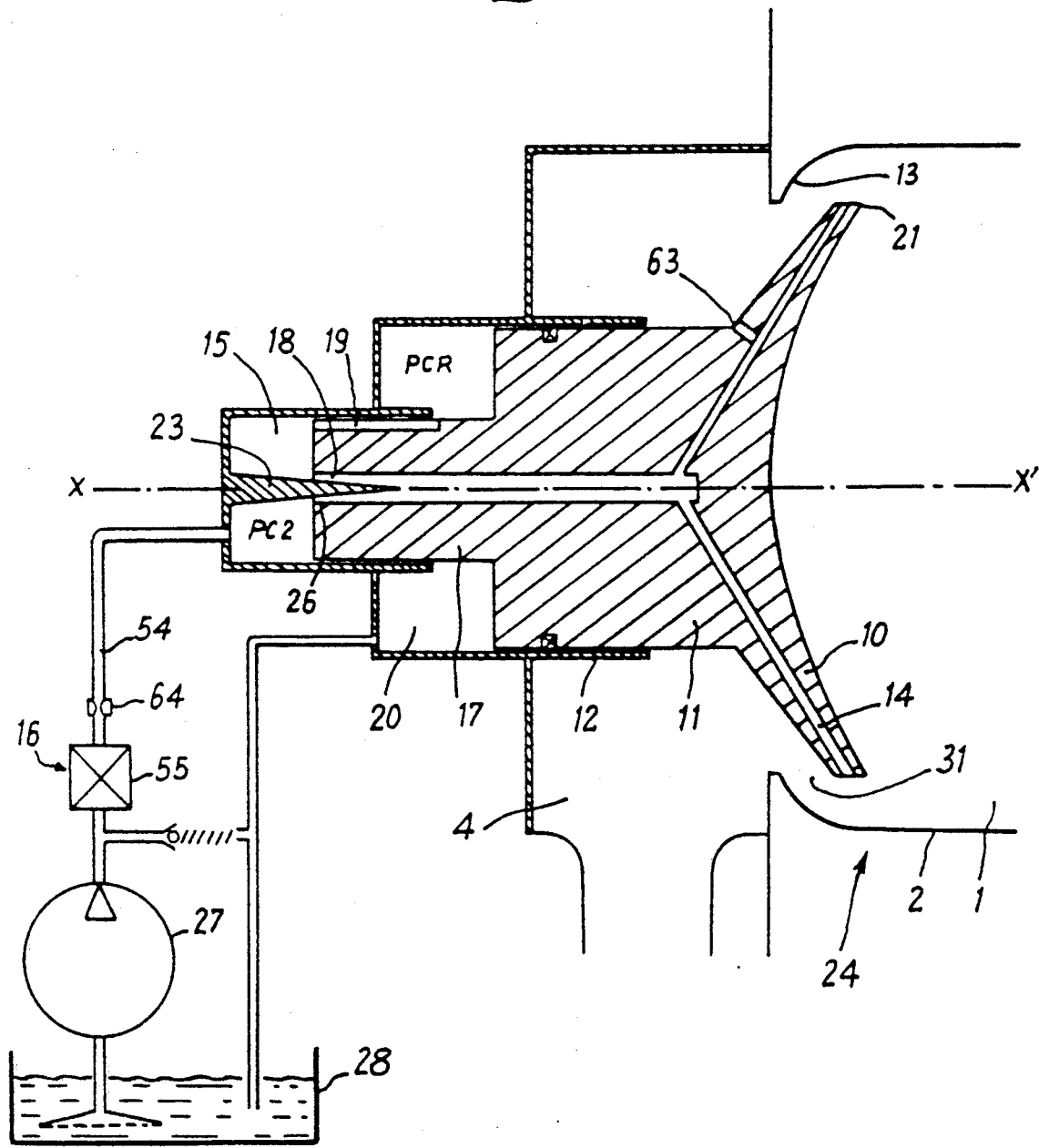
FIG. 3 is a diagrammatic axial sectional view to a still larger scale of the inner end of the auxiliary combustion chamber of FIG. 2 and of the means for supplying fuel to this chamber.

According to the advantageous construction shown diagrammatically in FIG. 3, the balancing piston 11 cooperates with a hydraulic piston 17 which is slidable in a fixed cylindrical cavity 15. This cavity 15 communicates with means 16 for producing variable fuel pressure PC2 and with the nozzles 14 through a variable jet 18. This jet 18 is formed by the cooperation of a needle 23 of conical or like shape/rigidly connected to the walls of the fixed cylindrical cavity 15, and/of means defining an orifice 26 carried by the hydraulic piston 17. As a variant, the needle 23 could be/rigidly connected to the piston 17 and the means defining the orifice 26 carried by the walls of the fixed cylindrical cavity 15. The assembly is such that the passage section of the variable jet 18 varies as a function of the position of the piston 17 in the cylindrical cavity 15 in the same direction as the passage section of the throttling means 31.

Preferably, the piston 17 has at least one recess 19 which puts the cavity 15, where the fuel is at pressure PC2, in communication with a discharge cavity 20 maintained at a pressure PCR lower than the minimum value of the variable pressure PC2. The communication between the cavities 15 and 20 is established through the recess 19 when the hydraulic piston travels beyond a previously established position in the direction for the maximum opening of the jet 18 (direction toward the right as viewed in FIG. 3).

As shown diagrammatically in FIG. 3, the means 16 producing a variable fuel pressure may be formed by a pump 27 which draws the fuel from a reservoir 28 and discharges it to the cylindrical cavity 15 through a discharge duct 54 on which a pressure regulating device 55 is mounted and arranged in such manner that the fuel pressure PC2 varies between a minimum value $(PC2)_{min.}$ and a maximum value $(PC2)_{max.}$, as a function of the passage section of the pressure regulating device connected in series with a fixed jet 64.

The balancing piston 11 may be rigidly secured to the hydraulic piston 17 as shown diagrammatically in FIGS. 3 and 4, or unconnected to the latter, as shown diagrammatically in FIG. 5, these two arrangements being described in detail hereinafter.

Figure 4:
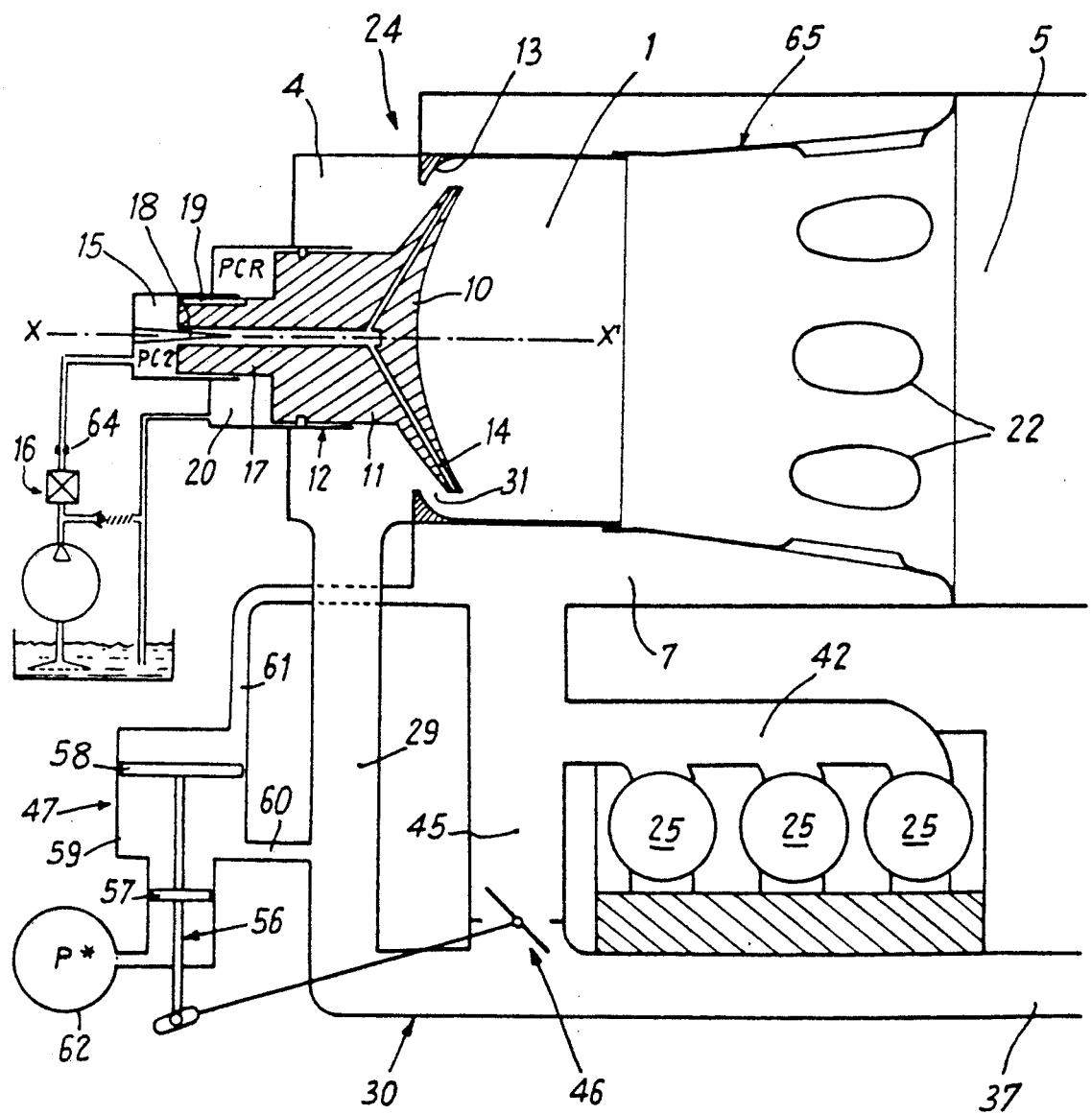
FIG. 4 is a detailed view of a supercharged engine provided with the auxiliary combustion chamber of FIG. 3.

According to the first arrangement illustrated in FIG. 4 in which the balancing piston 11 is rigidly secured to the hydraulic piston 17, the bypass pipe 30 is subdivided into two branches 29 and 45. The first branch 29, which is provided with first throttling means 31, puts the air outlet 37 of the compressor 38 in communication with the first cavity 4 supplying air to the primary zone 1 of the auxiliary combustion chamber 24. The second branch 45 puts this air outlet/37 in communication with the second cavity 7 supplying air to the secondary dilution zone 5 of the combustion chamber 24 and is provided with second throttling means 46 having a variable passage section and located in this branch 45 on the upstream side of the communication with the gas outlet 42 of the working chambers 25 of the engine 35. The second throttling means 46 are advantageously so actuated as to create a pressure difference $\Delta P$ which varies in the same direction as the pressure P prevailing on the upstream side of said second throttling means 46 and, more particularly, in proportion to the difference between the pressure P and a reference pressure P*. The second throttling means 46 may be actuated by control means 47 which are/advantageously arranged as illustrated in FIG. 4.

For this purpose, the control means 47 are responsive to the pressures respectively prevailing on the upstream and downstream sides of the second throttling means 46 and so adapted that the difference produced by these second throttling means 46 varies as a function of the pressure P, and preferably in the same direction as the latter, which prevails at any point of the circuit connecting the air outlet 37 of the compressor 38 to the gas inlet 40 of the turbine 41. Preferably, the pressure difference $\Delta P$ produced by the second throttling means 46 is proportional to the difference between said pressure P and a reference pressure P*. Such control means 47 have already been disclosed in French patents Nos. 2,179,310, 2,222,537 and 2,308,792 and may comprise two pistons 57 and 58 mounted on the same rod 56 which is coupled to the second throttling means 46, the cross-sectional area of the piston 57 being smaller than that of the piston 58. The two pistons 57 and 58 are movable in a stepped cylinder 59. The central part of the cylinder 59 located between the two pistons 57, 58 is connected through a duct 60 to the branch 29. The end part of the stepped cylinder 59 defined by the piston 58 of large diameter is connected through a duct 61 to the part of the branch 45 located on the downstream side of the second throttling means 47, while the other end part of the stepped cylinder, i.e. that defined by the piston 57 of small diameter is connected to a chamber 62 in which prevails the reference pressure P*. According to this arrangement, the thottling means 46 are balanced when the pressure difference $\Delta P$ will be equal to k times the pressure difference (P-P*), in which k is a coefficient equal to the ratio of the section of the piston 57 of small diameter to that of the piston 58 of large diameter, neglecting the diameter of the rod 56 interconnecting these two pistons.

Thus, in accordance with the teaching of FR-A-2,265,979, the primary combustion zone 1 of the auxiliary chamber 24 is permanently subjected to the pressure difference $\Delta P$, which ensures, in all conditons of operation of this chamber 24, a correct turbulence, correct fuel supply and a correct cooling.

Furthermore, owing to the fact that the cavity 7 communicates with the gas outlet 42 of the working chambers 25 and with the second branch 45 of the bypass pipe 40, the dilution tube 65 is permanently cooled on its outer wall by the sum of the air and gas flows through the ducts 45 and 42, this sum being substantially independent of the running speed of the engine 35.

Figure 5:
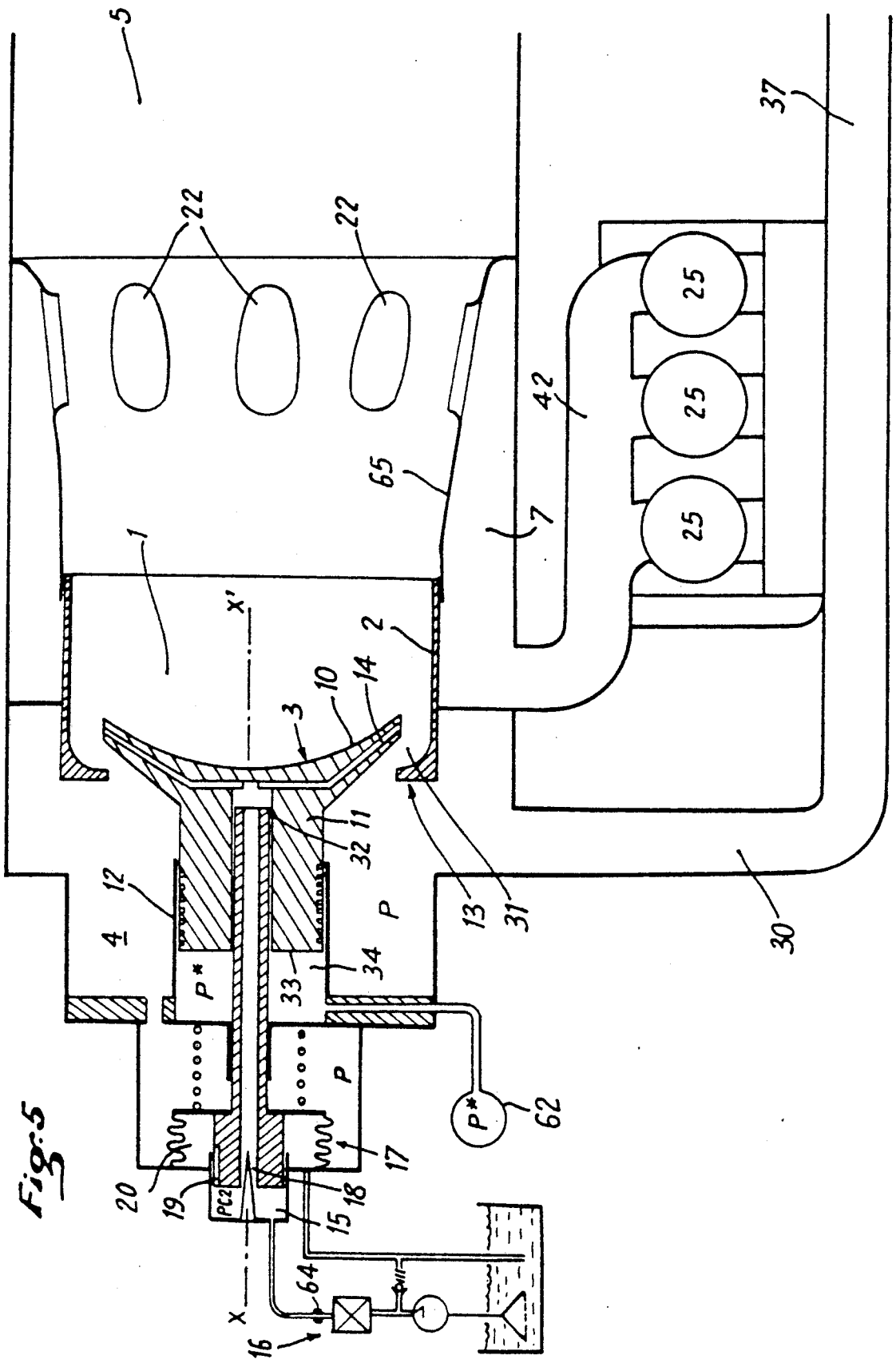
FIG. 5 is a view of a variant of the engine of FIG. 4.

According to the second arrangement which is illustrated in FIG. 5 and in which the balancing piston 11 is unconnected to the hydraulic piston 17, the bypass pipe 30 has only a single branch and the second throttling means 46 are coincident with the first throttling means 31. In this case, the latter are so arranged as to conjugate the effects of the first throttling means 31 with those of the second throttling means 46 as shown diagrammatically in FIG. 5 by way of example. The balancing piston 11 freely slides in the cylindrical part 12 in the direction for opening the first throttling means 31, i.e. toward the right as viewed in FIG. 5 and it cooperates, by bearing against an abutment 32/rigidly connected to the hydraulic piston 17, with this piston 17 when the throttling means 31 are moved in the closing direction. The side 33 of the balancing piston 11 remote from the sleeve 10 defines with the fixed cylindrical bearing surface 12 a cavity 34 in which prevails the reference pressure P* and which is separated from the first cavity 4 in which prevails the air pressure P defined hereinbefore. The assembly is such that the pressure difference produced by the first throttling means 31 is proportional to the difference between the air pressure P and the reference pressure P* when the balancing piston 11 is not bearing against the abutment 32.

Figure 6:
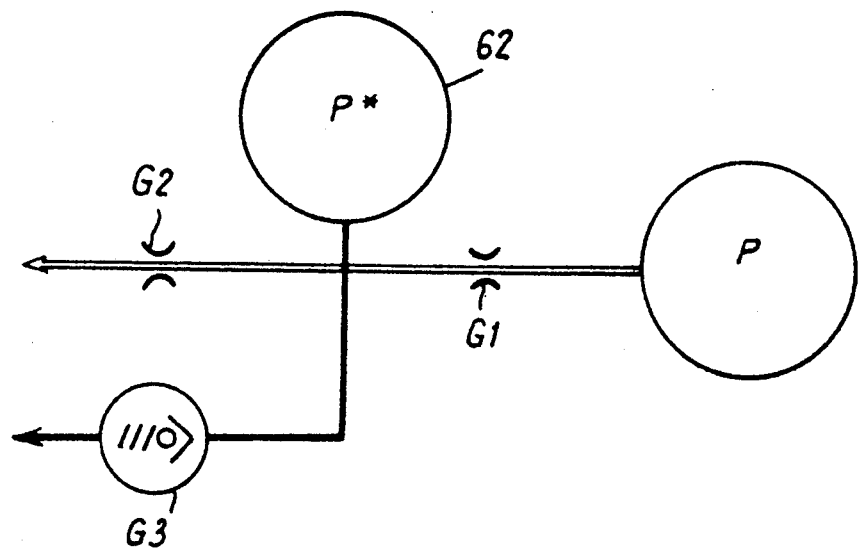
FIG. 6 is a view of means for establishing the reference pressure used in the embodiment of FIG. 4 or in the variant of FIG. 5.

In the case of FIGS. 4 and 5, the reference pressure P* is preferably variable as a function of the air pressure P in accordance with a predetermined law. As shown in FIG. 6, this law is advantageously realized by putting the chamber 62 at the reference pressure P* in communication with the cavity 4 at pressure P through a first fixed orifice G1 and with the atmosphere in parallel through a second fixed orifice G2 and a third orifice G3 having a spring-biased check valve which opens only when the reference pressure P* tends to exceed a predetermined threshold.

According to an important improvement illustrated in FIG. 7, there is arranged in the chamber inner end 3 a pilot combustion zone 48 which opens onto the primary zone 1 and is essentially constituted by a fuel sprayer 49 arranged on the axis X—X' of the sleeve 10. This fuel sprayer 49 permanently communicates with the fuel pressure producing means 16 (at the fixed and maximum pressure PC1) and opens onto a third cavity 50 which is coaxial with the axis X—X' and surrounds the nose of sprayer 49 as shown in FIG. 7. The third cavity 50 communicates with the first cavity 4 through fixed orifices (i.e. having a fixed passage section) 51 opening onto the third cavity 50 in a preferably tangential manner. These orifices 51 are so dimensioned as to permit the passage of the air ensuring the complete combustion of the fuel permanently introduced by the sprayer 49 under all the operational conditions of the auxiliary combustion chamber 24. The pilot combustion zone 48 advantageously includes said ignition means 52, which are then disposed in the sleeve 10 in the vicinity of the inlet of fuel introduced by the sprayer 49.

Lastly the chamber inner end 3 defining the third cavity 50 is preferably constituted by a double wall 53 of refractory material. This double wall 53 in which is developed the combustion of the fuel permanently introduced by the sprayer 49, is so arranged as to be permanently brought to a high temperature higher than 600° C. as soon as the pilot combustion zone 48 is operating. This double wall 53 thus constitutes a hot point capable of automatically reinitiating the combustion of the fuel introduced by the sprayer 49 in the event of an accidental and momentary extinction of the flame in the pilot combustion zone 48.

As briefly explained hereinbefore, the opening out of the nozzles 14 on the downstream side of the seat 13 permits an automatic purge of the nozzles 14 when the supply of fuel is stopped (the sleeve 10 bearing against the seat 13 and the central pilot combustion according to FIG. 7 remaining the sole effective combustion), provided the orifices 63 cause the passageway conducting the fuel to the nozzles 14 to communicate with the first cavity 4. This purge may be achieved by the mere action of the pressure difference which is created by the second throttling means 46 (FIG. 4) or the first throttling means 31 (FIG. 5) and is exerted on each side of the chamber inner end 3 through the orifices 63. The latter are arranged on the sleeve 10 (FIGS. 3 and 7) or the piston 11 (FIG. 2) on the upstream side of the seat 13 and put the nozzles 14 in communication with the air pressure P (cavity 4) on the upstream side of the first throttling means 31. The orifices 63 may facilitate the mixture between the air and the injected fuel. If it is desired to reduce the leakage flow of the air through the chamber 24 in the closed position (standby), it is possible to so arrange the orifices 63 that they are masked by the cylindrical bearing surface 12 when the sleeve 10 bears against the seat 13.

There is thus provided a supercharged engine 35 and auxiliary combustion chamber 24 which operate in the following manner:

1. Ignition and maintenance of the pilot flame (for example according to FIGS. 3 and 7).

The means 16, 27 producing the fuel pressure are actuated and directly supply fuel to the central sprayer 49. The ignition means (sparking plugs) 52 are brought into action. Owing to the good conditions of the spraying on the part of the sprayer 49, the ignition of the pilot flame is immediate, and, in the event of an accidental extinction in the course of operation of the engine, it is very rapidly re-established owing to the provision of the double wall 53 (FIG. 7).

2. Ignition of the principal part of the auxiliary combustion chamber 24.

The opening of the means 16 producing the fuel pressure permits feeding the cavity 15 at the maximum injection pressure PC2, which opens the passage between the seat 13 and the sleeve 10. Simultaneously, the turbocompressor 36 (FIG. 1) is rotated by suitable means so that the pressure P of the air delivered by the compressor 38 is increased and the chamber 24 is fed with air through the bypass pipe 30.

In opening, the chamber 24 clears the variable jet 18. The flow of fuel injected by the nozzles 14 is maximum, since the injection pressure is maximum and the passage section of the variable jet 18 is also maximum.

3. Variable limitation of the principal fuel flow (FIG. 3).

Owing to the inertia of the turbocompressor 36, there is a danger of overheating. Indeed, the air pressure P has not yet the maximum value corresponding to an air flow in the chamber 24 (the opening of which is maximum) capable of burning the maximum flow of fuel without overcharging or extinction (extinction due to excess mixture richness).

When the chamber 24 is opening, the hydraulic piston 17 uncovers the recess 19 and puts the cavity 15, at the fuel pressure PC2, in communication with the cavity 20 which is at the return pressure PCR (the pressure PCR being lower than the minimum value of the pressure PC2). Consequently, the pressure PC2 subsides owing to the presence of the calibrated orifice 64 which causes the hydraulic piston 17 to move back and close the jet 18 and causes the injected fuel flow to diminish. The return movement of the hydraulic piston 17 partly masks the recess 19 until the fuel pressure PC2 acting on this piston 17 balances the air pressure acting on the balancing piston 11. Thus, the fuel pressure PC2 increases linearly with the air pressure P, which prevents overheating during the acceleration periods of the turbocompressor 36. The latter will accelerate until the air pressure P reaches a value which balances the fuel injection pressure PC2 determined by the pressure regulating device 55, when the recess 19 is completely closed. In acting on the pressure regulating device 55, it is possible to regulate the air pressure P as desired.

4. Operation with the engine running in the case where the bypass pipe 30 is divided (FIG. 4).

4.1 Engine power increases

When the engine 35 is put under load, the temperature of the gases escaping from the working chambers 25 through the outlet 42 rises. These gases enter the cavity 7 and are mixed, owing to the action of the ports 22, with the gases coming from the primary zone 1 of the auxiliary combustion chamber 24. The energy of the gases entering the turbine 41 increases and this causes the air pressure P to rise and therefore breaks the balance of the balancing piston 11. The inner end 3 of the chamber 24 moves back and closes the throttling means 31 and the variable jet 18 until a new balance is reached.

Note that the pressure regulating device 55 permits acting on the entered value of the fuel pressure PC2 and therefore on the balance of the piston 11. In this way, it is easy to act on the value of the air pressure P and consequently on the air/fuel ratio in the engine 35.

4.2 Acceleration of the engine

If the engine 35 accelerates, it takes off a larger proportion of the air flow discharged by the compressor 38 into the pipe 37, which reduces the air flow in the branch 45 of the bypass pipe 30. The pressure drop $\Delta P$ across the second throttling means 46 decreases and this breaks the balance of the differential piston 57, 58. The latter moves until it resumes its balanced position, which closes a little more the throttling means 46 until the pressure drop value $\Delta P$ resumes the initial value corresponding to the value P.

Thus, the operation of the chamber 24 is not affected by the acceleration. A given pressure of air P results in a given position of the inner end 3 of the chamber 24 and therefore the same passage section of the first throttling means 31 (this value being regulated by the second throttling means 46), and therefore the same pressure drop value when passing through the throttling means 31 and therefore the same air flow and the same fuel flow and finally the same ratio between the air and the fuel.

5. Operation with the engine running, in the case where the bypass pipe 30 is not divided (FIG. 5).

5.1 Deceleration and acceleration of the engine

Upon a deceleration, the engine 35 takes off a smaller proportion of the air discharged by the compressor 38. The air flow increases in the bypass pipe 30 and this breaks the balance of the sleeve 10 carried by the piston 11. Indeed, the balance of the sleeve 10 is the following, when it is free to move, i.e. when it is not bearing against the abutment 32:

$$\Delta P = \frac{S - \sigma}{S - \sigma} \times (P - P^*)$$

in which:

S is the outside diameter of the sleeve 10
s is the diameter of the balancing piston 11 and $\sigma$ is the diameter of the rod of the piston 17 carrying the abutment 32.

In the case of a deceleration, the piston 11 moves freely toward the right as viewed in FIG. 5 until the balance is re-established:

$\Delta P = k (P-P^*)$.

In the case of an acceleration, the piston 11 moves toward the left as viewed in FIG. 5 (closure of the chamber 24) until it is stopped by the abutment 32.

5.2 Increase in power

The power is increased in the manner explained under the heading 4.1.

The air pressure P increases, which causes the hydraulic piston 17 and therefore the abutment 32 to move back. The air flow (throttling means 31) and the fuel flow (jet 18) progressively and simultaneously diminish.

What is claimed is:

1. Auxiliary combustion chamber (24) for an internal combustion engine (35) supercharged by a turbocompressor (36), the air outlet (37) of the compressor (38) communicating with the air inlet (39) of the working chambers (25) of the engine (35) and with a bypass pipe (30) provided with throttling means (31) having a variable passage section, and the gas inlet (40) of the turbine (41) communicating with the gas outlet (42) of said working chambers (25) and with the bypass pipe (30) on the downstream side of said throttling means (31), which combustion chamber (24) comprises:

a primary combustion zone (1) which is defined by a flame tube (2) and a chamber inner end (3) and communicates with a first cavity (4) connected to the bypass pipe (30), a secondary dilution zone (5) located on the downstream side of said primary zone (1) and communicating with a second cavity (7) connected to the gas outlet (42) of the working chambers (25), the gas outlet (8) of which communicates with the gas inlet (40) of the turbine (41), an inlet (9) for fuel under pressure which is provided in the chamber inner end (3) and opens onto the primary combustion zone (1) and ignition means (52) for the fuel coming from said fuel inlet (9), characterized in that the primary zone (1) has a shape of revolution about an axis (X—X') and is defined by the flame tube (2) which is of circular crosssectional shape, coaxial with said axis (X—X'), smooth and devoid of air supply orifices of notable section which may put the primary zone (1) in communication with said first cavity (4), the chamber inner end (3), which is movable in a direction parallel to said axis (X—X') and cooperates with a fixed seat (13) rigidly connected to the flame tube (2) and separating the primary zone (1) from the first cavity (4) so as to constitute, with the chamber inner end (3), the throttling means (31) with a variable passage section, and which is constituted by a sleeve (10) rigidly connected to a balancing piston (11), coaxial with said axis (X—X'), the balancing piston (11) being slidable in a cylindrical bearing surface (12) rigidly connected to the walls of the first cavity (4), and in that the inlet (9) of the fuel under pressure is constituted by at least one nozzle (14) which is arranged in said sleeve (10) in such manner as to open out toward the primary combustion zone (1).

2. Auxiliary combustion chamber according to claim 1, characterized in that it is arranged in such manner as to ensure that the air flow passing through the throttling means (31) has no rotating motion about said axis (X—X') liable to project the fuel mixed with said air flow outwardly under centrifugal effect.

3. Auxiliary combustion chamber according to claim 1, characterized in that said nozzles (14) are arranged at least approximately radially in the sleeve (10) so as to open out in the vicinity of the trailing edge (21) of said sleeve (10).

4. Auxiliary combustion chamber according to claim 3, characterized in that the nozzles (14) open out on the downstream side of the bearing surface of the sleeve (10) on the fixed seat (13).

5. Auxiliary combustion chamber according to claim 1, characterized in that the balancing piston (11) is cooperable with a hydraulic piston (17) slidable in a fixed cylindrical cavity (15) which communicates with variable fuel pressure (PC2) producing means (16) and with the nozzles (14) through a variable jet (18) realized by the cooperation of two elements, namely a needle (23) and an orifice (26), one of which elements is rigidly connected to the hydraulic piston (17) while the other element is rigidly connected to the fixed cylindrical cavity (15) so that the passage section of the variable jet (18) varies in the same direction as the passage section of the throttling means (31) having a variable passage section.

6. Auxiliary combustion chamber according to claim 5, characterized in that the movable hydraulic piston (17) comprises at least one recess (19) which puts the fixed cylindrical cavity (15) at the variable fuel pressure (PC2) in communication with a discharge cavity (20) maintained at a pressure (PCR) lower than the minimum value of said variable fuel pressure (PC2), the communication between the cavities (15 and 20) being established when the movable hydraulic piston (17) travels beyond a predetermined position in the direction for the maximum opening of the variable jet (18).

7. Auxiliary combustion chamber according to claim 1, characterized in that:
the balancing piston (11) is rigidly connected to the hydraulic piston (17) and
the bypass pipe (30) is divided into two branches (29 and 45):
the first branch (29) of the bypass pipe (30) putting the air outlet (37) of the compressor (38) in communication with the first supply cavity (4) of the primary zone (1) of the combustion chamber (24),
the second branch (45) of the bypass pipe (30) putting said air outlet (37) in communication with the second supply cavity (7) of the secondary dilution zone (5) of the combustion chamber (24) and being provided with second throttling means (46) having a variable passage section located on the upstream side of the communication with the second cavity (7) and on the upstream side of the communication with the gas outlet (42) of the working chambers (25) of the engine (35).

8. Auxiliary combustion chamber according to claim 7, characterized in that said second throttling means (46) having a variable passage section are actuated by control means (47) responsive to the pressures prevailing respectively on the upstream side and downstream side of said second throttling means (46) and arranged in such manner that the pressure difference produced by said second throttling means (46) varies solely as a function of the air pressure (P), and preferably in the same direction as the latter, prevailing at any point of the circuit connecting the air outlet (37) of the compressor (38) to the gas inlet (40) of the turbine (41).

9. Auxiliary combustion chamber according to claim 8, characterized in that the pressure difference (ΔP) produced by the second throttling means (46) is proportional to the difference between said air pressure (P) and a reference pressure (P*).

10. Auxiliary combustion chamber according to claim 1, characterized in that:
the balancing piston (11) is not connected to the hydraulic piston (17) and is freely slidable in the fixed cylindrical bearing surface (12) in the direction for opening the first-mentioned throttling means (31) and cooperates, by bearing against an abutment (32) rigidly connected to the hydraulic piston (17), with said hydraulic piston (17) when the first-mentioned throttling means (31) move in the closing direction,
the face (33) of the balancing piston (11) remote from the sleeve (10) defines, with the fixed cylindrical bearing surface (12), a cavity (34) in which a reference pressure (P*) prevails and which is separated from said first cavity (4) in which prevails the air pressure (P) prevailing at any point of the circuit connecting the air outlet (37) of the compressor (38) to the gas inlet (40) of the turbine (41),
in such manner that the pressure difference (ΔP) produced by said first-mentioned throttling means (31) having a variable passage section is proportional to the difference between the air pressure (P) and the reference pressure (P*) when the balancing piston (11) does not bear against the abutment (32) rigidly connected to the hydraulic piston (17).

11. Auxiliary combustion chamber according to claim 10, characterized in that the reference pressure (P*) is variable and is a function of said air pressure (P) according to a predetermined law.

12. Auxiliary combustion chamber according to claim 11, characterized in that said predetermined law is realized by putting the cavity (62) at the reference pressure (P*) in communication with the cavity at the air pressure (P) through a first fixed orifice (G1) and the same cavity at the reference pressure (P*) in communication with the atmosphere through a second fixed orifice (G2) and a third variable orifice (G3) which only opens when the reference pressure (P*) reaches a predetermined threshold.

13. Auxiliary combustion chamber according to claim 1, characterized in that a pilot combustion zone (48), arranged in the chamber inner end (3), opens onto said primary zone (1) and is constituted
by a fuel sprayer (49) arranged on said axis (X—X') of the sleeve (10) which permanently communicates with the fuel pressure producing means (16) and which opens onto a third cavity (50) coaxial with said axis (X—X') and surrounding the nose of said sprayer (49),
which third cavity (50) communicates through fixed orifices (51) preferably arranged tangentially or partly tangentially, with the first cavity (4),
said fixed orifices (51) being so dimensioned as to permit the passage of the air ensuring the complete combustion of the fuel permanently introduced by the sprayer (49) under all the conditions of operation of the combustion chamber (24).

14. Auxiliary combustion chamber according to claim 13, characterized in that said pilot combustion zone (48) comprises ignition means (52) disposed in the sleeve (10) in the vicinity of the inlet of the fuel introduced by the sprayer (49).

15. Auxiliary combustion chamber according to claim 13, characterized in that the chamber inner end defining the third cavity (50) is constituted by a double wall (53) composed of refractory material and so arranged as to be permanently brought to a high temperature higher than 600° C. as soon as the pilot combustion zone (48) is in operation, so as to constitute a hot point capable of automatically reinitiating the combustion of the fuel introduced by the sprayer (49) in the event of an accidental and momentary extinction of the flame in the pilot combustion zone (48).

16. Auxiliary combustion chamber according to claim 1, characterized in that the nozzles (14) are connected to purge orifices (63) communicating with the first cavity (4).

17. Auxiliary combustion chamber according to claim 1, characterized in that the nozzles (14) open onto a groove (67) which is preferably limited by an annular nose portion (66).

18. Internal combustion engine supercharged by a turbocompressor (36) whose air outlet (37) of the compressor (38) communicates with the air inlet (39) of the working chambers (25) of said engine (35) and with a bypass pipe (30) and whose gas inlet (40) of the turbine (41) communicates with the gas outlet (42) of said working chambers (25) and with said bypass pipe (30), an auxiliary combustion chamber (24) being mounted on said bypass pipe (30), which bypass pipe (30) is provided with throttling means (31), characterized in that the auxiliary combustion chamber (24) is arranged according to claim 1.

19. Auxiliary combustion chamber according to claim 9, characterized in that the reference pressure (P*) is variable and is a function of said air pressure (P) according to a predetermined law.

20. Auxiliary combustion chamber according to claim 19, characterized in that said predetermined law is realized by putting the cavity (62) at the reference pressure (P*) in communication with the cavity at the air pressure (P) through a first fixed orifice (G1) and the same cavity at the reference pressure (P*) in communication with the atmosphere through a second fixed orifice (G2) and a third variable orifice (G3) which only opens when the reference pressure (P*) reaches a predetermined threshold.

* * * * *